United States Patent
Arbeus et al.

(10) Patent No.: US 10,570,029 B2
(45) Date of Patent: Feb. 25, 2020

(54) SYSTEM FOR TREATING LIQUIDS BY APPLYING ULTRA-VIOLET RADIATION

(71) Applicant: Wallenius Water Innovation AB, Stockholm (SE)

(72) Inventors: Ulf Arbeus, Lidingo (SE); Staffan Strand, Stockholm (SE)

(73) Assignee: Wallenius Water Innovation AB, Stockholm (SE)

(*) Notice: Subject to any disclaimer, the term of this patent is extended or adjusted under 35 U.S.C. 154(b) by 0 days.

(21) Appl. No.: 16/097,480

(22) PCT Filed: May 23, 2017

(86) PCT No.: PCT/SE2017/050545
§ 371 (c)(1),
(2) Date: Oct. 29, 2018

(87) PCT Pub. No.: WO2017/204730
PCT Pub. Date: Nov. 30, 2017

(65) Prior Publication Data
US 2019/0092653 A1    Mar. 28, 2019

(30) Foreign Application Priority Data
May 25, 2016    (SE) .................................... 1650720-4

(51) Int. Cl.
*C02F 1/32*    (2006.01)
*C02F 1/78*    (2006.01)

(52) U.S. Cl.
CPC ................ *C02F 1/325* (2013.01); *C02F 1/78* (2013.01); *C02F 2201/324* (2013.01);
(Continued)

(58) Field of Classification Search
CPC .... C02F 1/325; C02F 1/78; C02F 2201/3223; C02F 2301/046; C02F 2201/328; C02F 2301/026; C02F 2201/324
See application file for complete search history.

(56) References Cited

U.S. PATENT DOCUMENTS 5,266,280 A * 11/1993 Hallett ................... B01J 19/123
422/186
5,503,800 A    4/1996 Free
(Continued)

FOREIGN PATENT DOCUMENTS

CA    2048574 A1    2/1992
SE    43295 C1    4/1915
(Continued)

OTHER PUBLICATIONS

International Search Report PCT/ISA/210 for International Application No. PCT/SE2017/050545 dated Aug. 15, 2017.
(Continued)

*Primary Examiner* — Brooke Purinton
(74) *Attorney, Agent, or Firm* — Harness, Dickey & Pierce, P.L.C.

(57) ABSTRACT

A liquid treatment system (2) comprising a liquid enclosure (4) having a main axis A, at least one ultra-violet (UV) light source (6) with an extension along said main axis and configured to emit UV light to a liquid in the liquid enclosure (4). The liquid enclosure comprises at least one liquid section (8) with an extension along the main axis and structured to contain the liquid. The system (2) comprises swirl generating members (12) configured to generate a swirling motion of the liquid around a swirling axis S in the at least one liquid section (8) wherein the swirling axis is essentially parallel to the main axis, wherein the swirling motion is such that a controlled varying distance is induced to essentially all liquid elements of the liquid in relation to (Continued)

said light source (6) such that essentially all liquid elements are moved into high UV radiation zones closest said UV transparent wall (10), to achieve uniform UV radiation of the liquid.

16 Claims, 2 Drawing Sheets

(52) U.S. Cl.
CPC .............. *C02F 2201/328* (2013.01); *C02F 2201/3223* (2013.01); *C02F 2301/026* (2013.01)

(56) References Cited

U.S. PATENT DOCUMENTS

| | | | |
|---|---|---|---|
| 5,625,194 A | 4/1997 | Stitzel et al. | |
| 5,866,910 A | 2/1999 | Cooke et al. | |
| 6,224,759 B1 | 5/2001 | Whitby et al. | |
| 6,332,981 B1 | 12/2001 | Loyd | |
| 6,420,715 B1 | 7/2002 | Cormack et al. | |
| 7,385,204 B2 | 6/2008 | Bircher et al. | |
| 8,696,192 B2 | 4/2014 | Sprague | |
| 2001/0042708 A1* | 11/2001 | Barnes | C02F 1/006 210/192 |
| 2002/0096648 A1 | 7/2002 | Kaiser et al. | |
| 2005/0242013 A1* | 11/2005 | Hunter | A61L 2/10 210/143 |
| 2009/0084734 A1* | 4/2009 | Yencho | C02F 1/325 210/741 |
| 2010/0166601 A1* | 7/2010 | Bircher | B01F 5/0618 422/24 |
| 2011/0100885 A1* | 5/2011 | Lee | B63J 4/002 210/85 |
| 2011/0318237 A1 | 12/2011 | Woodling et al. | |
| 2013/0153514 A1 | 6/2013 | Stern et al. | |

FOREIGN PATENT DOCUMENTS

| | | |
|---|---|---|
| WO | WO-2006083218 A1 | 8/2006 |
| WO | WO-2006100534 A1 | 9/2006 |
| WO | WO-2007079749 A1 | 7/2007 |

OTHER PUBLICATIONS

Swedish Search Report for Application No. 1650720-4 dated Dec. 2, 2016.
Written Opinion of the International Searching Authority PCT/ISA/237 for International Application No. PCT/SE2017/050545 dated Aug. 15, 2017.

\* cited by examiner

SYSTEM FOR TREATING LIQUIDS BY APPLYING ULTRA-VIOLET RADIATION

CROSS-REFERENCE TO RELATED APPLICATIONS

This application is a national phase under 35 U.S.C. § 371 of PCT International Application No. PCT/SE2017/050545 which has an International filing date of May 23, 2017, which claims priority to European Application No. 1650720-4, filed May 25, 2016, the entire contents of each of which are hereby incorporated by reference

TECHNICAL FIELD

The present disclosure relates to a liquid treatment system for treating a liquid by applying ultra-violet (UV) radiation to the liquid to be treated according to the preamble of the independent claim.

BACKGROUND

There are many applications where UV light sources are used for treating liquids. Wallenius Water AB in Sweden has developed and is selling water treatment equipment having a water purifier comprising an elongated tubular treatment chamber with an inlet and an outlet. In the centre of the treatment chamber a generally tubular quartz glass is arranged and inside the quartz glass is a UV source arranged, such as a lamp capable of generating wavelengths in the UV region.

An important aspect of UV-light treatment is to ensure that as much liquid as possible is treated, i.e. exposed, to a predefined lowest UV-light treatment dose. Thus, it must be possible to guarantee that specified treatment requirements are fulfilled, e.g. that essentially a major part of the liquid receives a UV-dose that is above a predetermined UV-light treatment dose threshold.

One type of UV-light treatment reactor comprises an elongated UV-lamp arranged within a protective sleeve and provided with a circumferential channel outside the sleeve where the liquid is intended to flow. In the channel the liquid closest to the sleeve will receive the highest dose. And consequently the liquid farther out from the sleeve will receive a lower dose.

The treatment chamber may be considered to have different dose intensity zones. Closest to the UV-lamp is the dose intensity zone having the highest UV-light dose.

Micro-organisms are inactivated by UV light as a result of damage to nucleic acids. The high energy associated with short wavelength UV energy, primarily around 260 nm, is absorbed by cellular RNA and DNA. This absorption of UV energy forms new bonds between adjacent nucleotides, creating double bonds or dimers. Dimerization of adjacent molecules, particularly thymine, is the most common photochemical damage. Formation of numerous thymine dimers in the DNA of bacteria and viruses prevents replication and their ability to infect.

The germicidal effects of UV are directly related to the dose of UV energy absorbed by a micro-organism. The UV dose is the product of the UV intensity and the time that a micro-organism is exposed to UV light (often referred to as residence time). The required disinfection limit or log-reduction will dictate the required UV dose. UV dose is typically expressed in $mJ/cm^2$, $J/m^2$ or $\mu Ws/cm^2$. The exposure time of the UV system is determined by the reactor design and the flow rate of the water. The intensity is affected by the equipment parameters (such as lamp type, lamp arrangement, etc.) and water quality parameters (such as UV transmittance, etc.). Unlike chemical disinfectants, UV disinfection is not affected by the temperature, turbidity or pH of the water.

The UV dose response of a micro-organism is a measurement of its sensitivity to UV light and is unique to each micro-organism. A UV dose response curve is determined by irradiating water samples containing the micro-organism with various UV doses and measuring the concentration of viable infectious micro-organisms before and after exposure. The resultant dose response curve is a plot of the log inactivation of the organism versus the applied UV dose rate. 1-log inactivation corresponds to a 90% reduction; 2-log to a 99% reduction; 3-log to a 99.9% reduction and so on.

Thus, in order to achieve effective performance with regard to deactivation of micro-organisms, the reactor has to be designed to ascertain that also the liquid farther away from the UV-lamp receives the required dose, which may be achieved by increasing the UV radiation. However, this has a negative impact of the energy consumption of the UV-lamp, which will be high.

In the following some exemplary prior art will be discussed, that disclose various related aspects, and specifically devices where various types of mixing of the liquid is provided.

U.S. Pat. No. 6,224,759 relates to a UV system comprising UV lamp units intended to radiate UV-light to a liquid. By arranging ring-shaped devices, e.g. washers, on each lamp unit the turbulent mixing of the liquid is increased.

U.S. Pat. No. 6,420,715 relates to a method and an apparatus for improved mixing in fluids in a UV-light treatment system. The apparatus includes means, e.g. delta wings, specially shaped baffles, propellers or contoured flow tubes, for inducing vortices in the fluid flow through UV-light treatment system.

U.S. Pat. No. 7,385,204 relates to a fluid treatment device configured to treat a fluid with UV light. The device comprises a modular assembly including at least one baffle, e.g. a set of two baffles. The lamp geometry and baffles act as a baffling mechanism to direct the flow of fluid so as to increase uniformity in dose distribution by causing the fluid to flow into an area where it will receive uniform treatment.

U.S. Pat. No. 8,696,192 relates to an apparatus comprising non-planar baffles included in the flow such that a flow is permitted to pass the baffle in a gap between the inner peripheral edge and the outer surface of the UV-transparent inner tube. Thereby vortices are induced in the liquid flow with the intention to increase efficiency in UV-light treatment.

In US2011/0318237 is disclosed a UV reactor comprising a baffle having a helical shape to provide for radial mixing of liquid. In another variation segmented baffles are provided to achieve helical mixing.

And finally, US2013/0153514 relates to an apparatus for treating fluids using ultraviolet light. The disclosure is in particular directed to a treatment chamber having an elliptical cross-sectional shape, but also mixing aspects are discussed. A mixing device is provided within a UV-transmissive conduit comprising fixed or rotating fins in order to facilitate uniform rotational mixing throughout the length of the conduit, and thereby enhancing dosage uniformity.

Thus, the intention in many of the solutions presented herein is to achieve an enhanced radial mixing of the fluid in the treatment reactor in order to achieve a more uniform UV-light treatment dose. Various means are presented to achieve this object, e.g. "open solutions" are applied, i.e.

where means, e.g. wings, are arranged to control the formation of helix-shaped liquid flows within a liquid enclosure.

The object of the present invention is to achieve an improved liquid treatment system with regard to an improved bacteria reduction in comparison to a conventional treatment device of today of a corresponding size. The system also improves the capabilities with regard to energy consumption and also with regard to decrease the adherence of fouling or scaling to the UV-transparent surfaces.

SUMMARY

The above-mentioned object is achieved by the present invention according to the independent claim.

Preferred embodiments are set forth in the dependent claims.

By providing, at least one separate, essentially closed liquid section within a liquid enclosure and generating a controlled swirling motion of the liquid within the liquid section the above object is achieved. Thereby a controlled varying distance is induced to essentially all liquid elements of the liquid in relation to the UV light source such that essentially all liquid elements are moved into high UV radiation zones closest to the UV transparent wall in order to achieve uniform UV radiation of the liquid.

An advantageous aspect of the liquid treatment system disclosed herein is that the swirling motion results in that a uniform UV radiation of the liquid is achieved, and that this is achieved in a more efficient and energy saving way in comparison to the prior art solutions, e.g. by generating the swirling motions in separate liquid sections.

In addition, the swirling motion improves the capability of reducing the adherence of fouling or scaling to the UV-transparent surfaces.

In one embodiment the liquid enclosure comprises a non-UV-radiation part provided with means for injecting ozone into the liquid.

In one further embodiment, cleaning particles are induced into the liquid sections and made to follow the swirling motion of the liquid resulting in a further improved capability of reducing or removing fouling/scaling at the UV-transparent surfaces.

DETAILED DESCRIPTION

The liquid treatment system will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
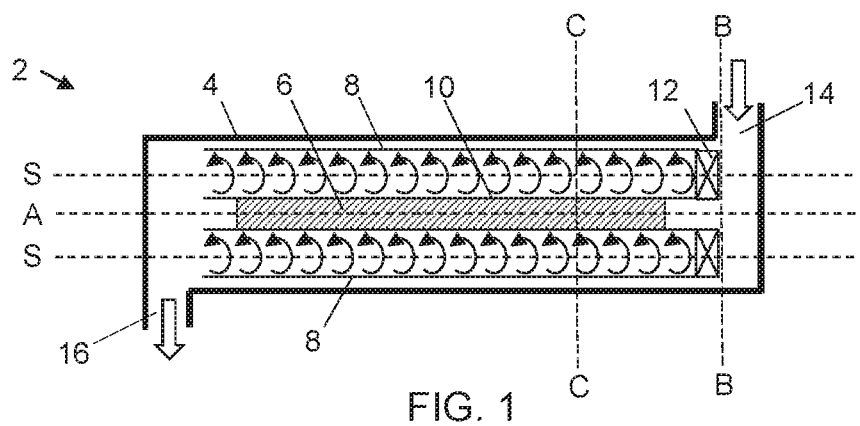
FIG. 1 is a cross-sectional view along the longitudinal axis of the liquid enclosure according to the present invention.

With references to FIG. 1 a liquid treatment system 2 is provided that is intended for treating a liquid with ultraviolet (UV) light. The treatment system is applicable for all UV light treatments of liquid, both for so-called flow-through versions and so-called batch-treatment versions of the system. The liquid may be drinking water, ballast water, edible liquid, e.g. juices, but also cutting liquids.

The system comprises a liquid enclosure 4 having a main axis A, and at least one ultraviolet (UV) light source 6 with an extension along the main axis and configured to emit UV light to a liquid in the liquid enclosure 4.

The liquid enclosure comprises at least one liquid section 8 with an extension along the main axis and structured to contain the liquid. The at least one liquid section 8 is provided with a UV light transparent wall 10 at least at a side facing the UV light source 6.

The liquid enclosure is preferably made from a metal or another suitable material having a protective capability.

The liquid treatment system 2 further comprises swirl generating members 12 configured to generate a swirling motion of the liquid around a swirling axis S in the at least one liquid section 8 and that the swirling axis is essentially parallel to the main axis. The swirling motion is indicated by arrows in the figures. The swirling motion is such that a controlled varying distance is induced to essentially all liquid elements of the liquid in relation to the light source 6 such that essentially all liquid elements are moved into high UV radiation zones closest to the UV transparent wall 10, to achieve uniform UV radiation of the liquid.

The expression "high" in high UV radiation zone is meant the UV radiation in comparison to locations at larger distances from the UV light source, where zones are located having gradually lower UV radiation.

Preferably, the light source 6 has an elongated extension along the main axis A, and that the at least one liquid section also has an elongated extension.

Two main and principally different variations of the liquid enclosure will be described. One flow-through version where the liquid to be treated flows through the liquid section(s) during treatment, and one batch-treatment version where the liquid is poured into the liquid enclosure and liquid section(s) where it is treated and then poured out from the enclosure when the treatment is concluded. The batch-treatment version is in particular illustrated in FIGS. 7 and 8.

The flow-through version is illustrated e.g. in FIG. 1.

According to this embodiment the liquid enclosure 4 comprises an inlet opening 14 structured to receive the liquid to flow through the liquid sections 8 and an outlet opening 16 structured to receive the liquid from the liquid sections in order to expel it from the liquid enclosure. In the schematic illustration in FIG. 1, two liquid sections 8 are shown.

The swirl generating member 12 is either an active or a passive element. Generally, both active and passive elements are applicable to both versions of the system. However, for flow-through versions passive elements are normally preferred, and for batch-treatment versions active elements are normally applied.

If it is an active element it may be embodied by e.g. a stirring element, a propeller, an impeller, a magnetic stirrer, etc.

If instead the swirl generating member is a passive element it may be implemented by specifically shaped wings, baffles, fins, etc.

Figure 2:
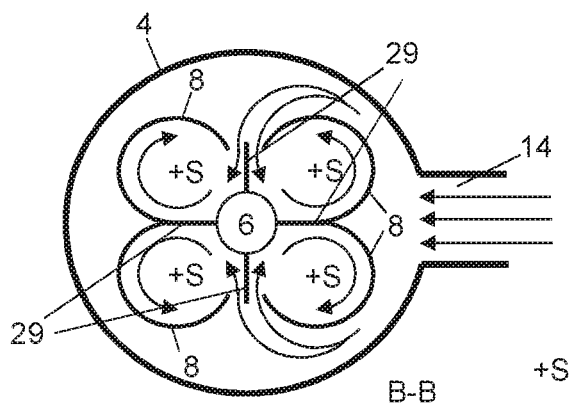
FIGS. 2-6 show cross-sectional views perpendicular to the longitudinal axis of the liquid enclosure according to different embodiments of the present invention.

FIG. 2 is a cross-sectional view along line B-B in FIG. 1 and illustrates schematically a liquid enclosure 4 comprising four liquid sections 8.

Liquid will enter the liquid enclosure via the inlet opening 14 which is arranged in connection to the liquid sections 8. The liquid may be pumped by an external pump (not shown). Inside the inlet opening 14 the swirl generating members 12 are provided which are structured to guide liquid into the liquid sections 8 essentially along a tangential direction of a an outer wall of the liquid section. In this embodiment the swirl generating members are openings in the outer walls of the liquid sections which are provided with guiding wall elements. Due to the pressure by which the liquid enters the liquid enclosure the liquid is forced to enter the liquid sections via the openings.

Figure 3:
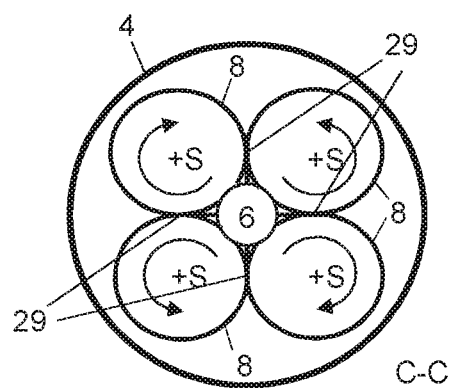

FIG. 3 is a cross-sectional view along line C-C in FIG. 1, where the liquid enclosure 4 comprises four liquid sections 8.

In the embodiment illustrated in FIGS. 2 and 3 the liquid sections have essentially circular cross-sections, which is applicable to all embodiments disclosed herein. The swirling motion is then a spiral-like flow of liquid around axis S through each of the liquid sections. Naturally other geometrical shapes of the cross-sections are possible. As non-limiting examples are essentially square or rectangular cross-sections where the inner corners are rounded to enable the swirling motion; elliptical cross-sections; pentagonal, hexagonal or octagonal cross-sections where the inner corners are rounded.

The batch-treatment version of the liquid enclosure will now be described with references to FIGS. 7 and 8. According to this embodiment the liquid enclosure 4 is a container 24 provided with a container opening 26 structured such that it enables filling and emptying the container with a batch of the liquid to be treated. The opening 26 is provided with an openable lid 28.

Figure 7:
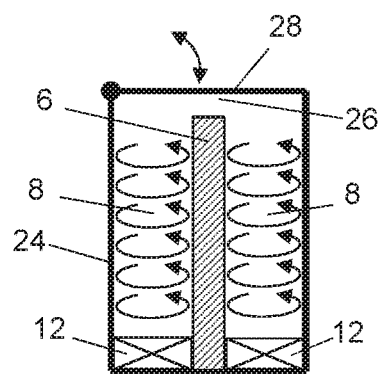
FIGS. 7 and 8 shows cross-sectional views along the longitudinal axis of the liquid enclosure according to other embodiments of the present invention.

In FIG. 7 is disclosed a variant where two liquid sections are provided, thus two swirling motions are induced by the swirl generating members 12. These may be magnetic stirring means at the bottom of each of the liquid sections.

Figure 8:
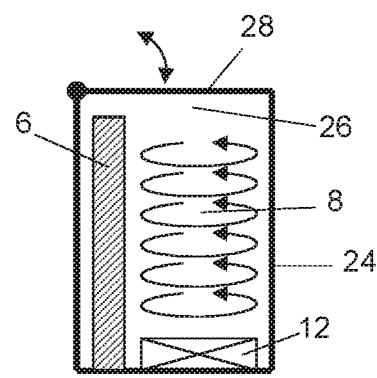

In FIG. 8 only one liquid section is included. In that case the UV light source may be arranged close to one of the outer walls of the liquid container, or in the middle of the container 24.

Figure 4:
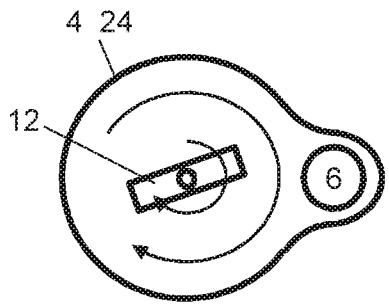
Figure 5:
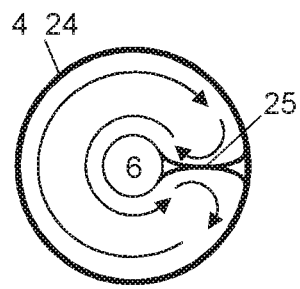
Figure 6:
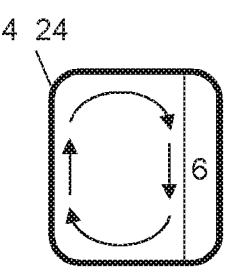

FIGS. 4-6 schematically illustrates cross-sectional views of the liquid container 24 provided with only one liquid section.

In FIG. 4 the UV light source 6 is arranged in a niche close to an outer wall of the container 24. The swirling motion is achieved by a magnetic stirrer 12 at the bottom of the container 24.

In FIG. 5 the UV light source 6 instead is arranged in the centre of the liquid container 24. An inner wall 25 is provided connecting the outer wall to the UV light source enclosure. The inner wall is shaped such that a liquid swirl is achieved as indicated in the figure by the arrow running along the outer wall into and around the UV light source and then out again.

In the embodiment illustrated in FIG. 6 the UV light source 6 is an integral part of an outer wall of the liquid container. The UV light source 6 may then be a high voltage field emission UV light source, and the liquid swirl may then be achieved as in FIG. 4 by a magnetic stirrer.

In various embodiments of the liquid treatment system it comprises at least two liquid sections 8 and that the liquid sections are separated by separation walls 29, see FIGS. 2 and 3. This is applicable both in the flow-through versions and in the batch-treatment versions.

Preferably the liquid treatment system comprises 3-5 liquid sections 8 which may be symmetrically arranged around the light source 6 seen in a plane perpendicular to the main axis A. This is illustrated by the embodiments shown in FIGS. 2 and 3.

Each liquid section 8 is preferably an essentially closed enclosure and each liquid section 8 is structured as a liquid channel running along the UV-light source. By providing each liquid section as an essentially separate closed enclosure the induced swirling motion of the liquid can be accurately controlled.

Each liquid section 8 is provided with an inner cross-sectional shape that enables a swirl within the liquid section throughout the length of the section. The inner surface of the liquid section has an even extension such that the liquid swirl may move unrestricted within the liquid section. Particularly, the inner surface has an even extension in the longitudinal direction along the main axis A, thus no ridges, fins, flanges or other obstructions exist that may induce pressure losses.

Figure 9:
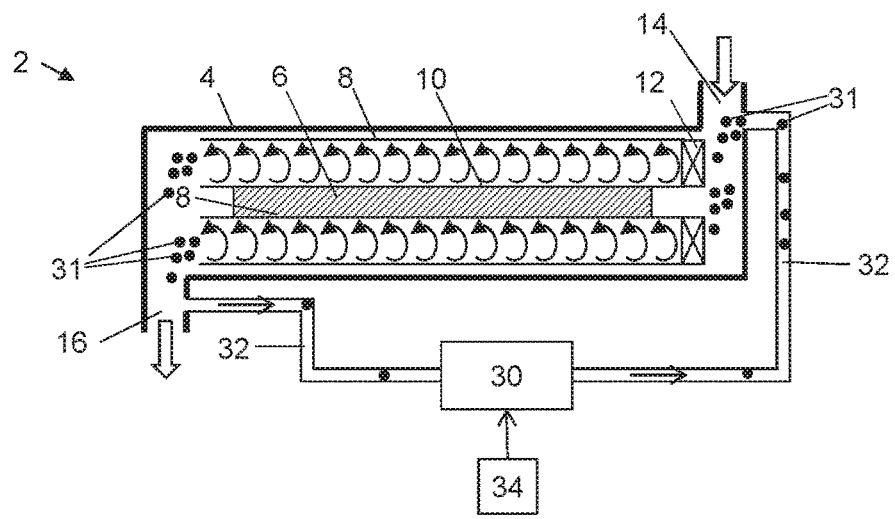
FIG. 9 is a cross-sectional view along the longitudinal axis of the liquid enclosure according to a further embodiment of the present invention.

Now with references to FIG. 9 a further embodiment of the liquid treatment system will be described. The aspect covered by this embodiment is to supply cleaning particles into the liquid in such a way that the particles will follow the liquid swirl in the liquid section(s) and thereby prevent scaling/fouling from adhering to the surface of the UV transparent wall 10. The cleaning particles have an abrasive capability. This is applicable to all embodiments described herein.

Thus, the system comprises a particle supplying member 30 configured to supply cleaning particles 31 (schematically indicated as black dots) into the liquid and into the at least one liquid section 8, for preventing scaling/fouling from adhering to the surface of the UV transparent wall 10. Preferably a by-pass line 32 is provided that is configured to transport liquid and particles from the outlet opening 16 back to the inlet opening 14 of the liquid enclosure via the particle supplying member. To filter out particles from the liquid flow at the outlet opening a particle filter, e.g. a net or screen, is preferably applied capable of filter out and direct cleaning particles and a small liquid flow into the by-pass line 32. A similar filter may also be provided in relation to the inlet opening to prevent the particles from escaping the liquid enclosure.

To control the supply of cleaning particles the system further comprises a control unit 34 capable of controlling the particle supplying member 30 by a control signal indicated by an arrow to control the supply of particles into the inlet opening 14 in accordance with a predetermined particle supply procedure, that at least comprises instructions for intermittent supply of particles, e.g. to supply cleaning particles 4-6 times each 24 h during a treatment period of 1-25 minutes.

The particle supplying member comprises a particle storage member structured to store particles to be supplied to the inlet opening 14, and that the control unit 34 is capable of controlling the opening and closing of a closing member of the particle supplying member 30 such that particles are supplied to the inlet opening 14.

Figure 10:
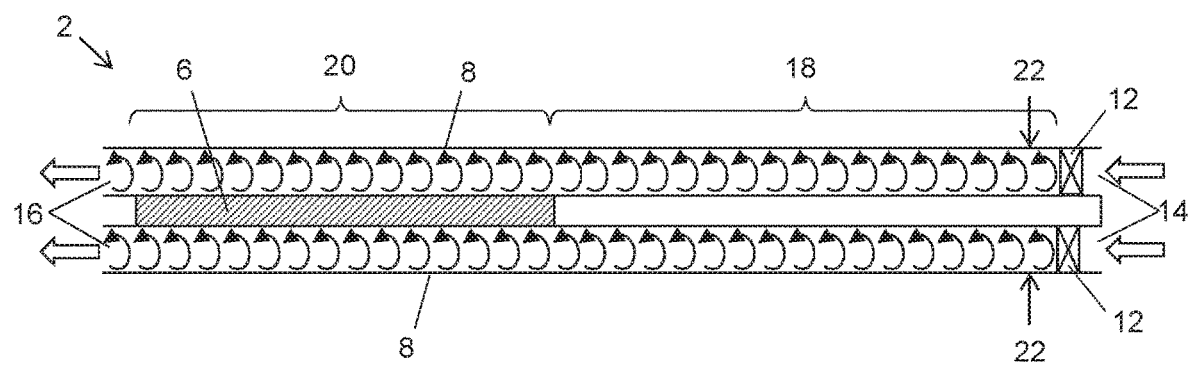
FIG. 10 is a cross-sectional view along the longitudinal axis of the liquid enclosure according to still another embodiment of the present invention.

With references to FIG. 10, a further embodiment of the liquid treatment system will now be described. It should be noted that FIG. 10 is a simplified illustration where various parts have been omitted for sake of simplicity.

According to this embodiment each liquid section 8 is provided with a non-UV-radiation part 18 located upstream a UV-radiation part 20. A UV light source is arranged for irradiating liquid in the liquid section(s) in the UV-radiation part 20 as being described in connection with the other embodiments. In the non-UV-radiation part 18 the liquid section(s) has been lengthened in the upstream direction.

The system comprises at least one ozone injecting member 22 located in connection with the non-UV-radiation part, and structured to inject ozone into the liquid flowing in the non-UV-radiation part, and in particular to inject ozone in a position close to the inlet opening 14. An advantageous effect of the injected ozone will be achieved due to the swirling motion inside the liquid section that improves the mixing of the ozone into the liquid.

Using both ozone and UV light have long been used for inactivation of pathogenic organisms that can thrive in water and wastewater systems.

Low-pressure mercury vapour lamps emit UV light with particular intensity peaks at 254 nm and 185 nm. The short-wave radiation is effective at breaking molecular bonds in the DNA of microorganisms. UV radiation also provides the energy necessary to spark the decomposition of ozone, which leads to the formation of two hydroxyl radicals (OH). This oxidant is the key component in the Advanced Oxidation Processes (AOP—the combinations of ozone, UV and/or hydrogen peroxide reactions.

The ozone/UV combination effectively destroys organic contaminants largely because of the very high oxidation potential of the hydroxyl radical (2.8 eV). For ozone/UV reactions in aqueous solution, ozone is energized and combines with water to create OH, which is stronger and less selective than either chemical oxidant. Ozone effectively reacts with the organic contaminants it can impact, with remaining residual ozone converting into two hydroxyl radicals per ozone molecule.

One benefit of AOPs such as ozone/UV is that with their increased oxidation levels, even stubborn organics that resist degradation can be partially oxidized to the point where they are more readily biodegradable. The benefits of ozone preoxidation followed by UV primary disinfection for waters with Cryptosporidium are an excellent approach for utilities to meet authorities' water treatment regulations. In the UV radiation part 20 the UV light will neutralize the remaining ozone.

The key parameters for the success of an ozone/UV system are ozone dosage, UV irradiation level and pH. For proper ozone dosing, a high dissolved ozone rate must be maintained with effective transfer of ozone gas into aqueous solution. One effective design for ozone/UV systems is a pressurized injection secondary mix UV/O3 reactor, a system that creates microbubbles, constant renewal of the gas-to-liquid mixing zone and enhanced gas solubility for better utilization of UV irradiation. As pH increases, ozone will more readily be converted to hydroxyl, which increases the oxidation rate of certain contaminants like pesticides and cyanide. The balance between pH level, UV photolysis and ozone dosage must be considered in system design and control for maximum efficiency.

Various aspects and types of the UV light source will now be further discussed. There are two UV lamp-types which are most commonly used in UV light treatment systems: medium pressure and low pressure lamps. The pressure relates to the mercury-gas pressure within the lamp. Both types are applicable in all embodiments disclosed herein.

Low pressure lamps are elongated lamps—conventionally about a meter in length—with low output per lamp (ranging between 30-600 W). For disinfection purposes, low pressure lamps emit a monochromatic wavelength of 253.7 nm (254 nm) at high intensity. Medium pressure lamps are normally considerably shorter than low pressure ones, with high output per lamp (normally ranging between 1-12 kW, but also up to 50 kW). Medium pressure lamps emit a wide germicidal wavelength between 200-320 nm at various intensities. Medium pressure lamps also emit 254 nm wavelength, but not as intensive as low pressure lamps.

In one further embodiment the UV light source 6 is a medium pressure UV lamp. This type of UV lamp may be advantageous in that one medium pressure UV lamp may replace a plurality of low pressure UV lamps due to its high output per lamp.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A liquid treatment system, comprising:
   a liquid enclosure having a main axis and a ultra-violet (UV) light source with an extension along the main axis, the UV light source configured to emit UV light to irradiate a liquid in the liquid enclosure, the liquid enclosure including at least two liquid sections extending in parallel along the main axis with the UV light source and structured to contain the liquid, wherein the at least two liquid sections each include a UV light transparent wall at least at a side facing the UV light source;
   wherein the at least two liquid sections are separated by at least one separation wall; and
   a plurality of swirl generating members configured to generate a swirling motion of the liquid around separate, respective swirling axes in separate, respective liquid sections of the at least two liquid sections,
   wherein each swirling axis is parallel to the main axis,
   wherein the swirling motion is such that a controlled varying distance is induced to liquid elements of the liquid in relation to the UV light source such that liquid elements are moved into high UV radiation zones closest the UV light transparent wall, to achieve uniform UV irradiation of the liquid,
   wherein the liquid enclosure further includes an inlet opening and an outlet opening, the at least two liquid sections arranged in parallel between the inlet opening and the outlet opening, such that the inlet opening is structured to direct the liquid to flow through the at least two liquid sections simultaneously and the outlet opening is structured to expel the liquid from the at least two liquid sections in parallel, to cause separate streams of the liquid to flow between the inlet opening and the outlet opening through separate liquid sections of the at least two liquid sections in parallel,
   wherein the inlet opening includes the plurality of swirl generating members structured to guide separate streams of the liquid into separate, respective liquid sections of the at least two liquid sections along respective tangential directions of outer walls of the separate, respective liquid sections such that the separate streams of the liquid entering the separate, respective liquid sections have respective unit vectors that are tangential to the outer walls of the separate, respective liquid sections.

2. The liquid treatment system according to claim 1, wherein the UV light source has an elongated extension along the main axis, and the at least two liquid sections each have an elongated extension.

3. The liquid treatment system according to claim 1, wherein the swirling motion is a spiral-like flow of each separate stream of the liquid through a separate liquid section of the at least two liquid sections.

4. The liquid treatment system according to claim 1, wherein
the at least two liquid sections each include UV radiation part and a non-UV-radiation part located proximate to the inlet opening in relation to the UV radiation part, and
the liquid treatment system further includes at least one ozone injecting member located in connection with the non-UV-radiation parts of the at least two liquid sections, the at least one ozone injecting member structured to inject ozone into liquid flowing in the non-UV-radiation parts.

5. The liquid treatment system according to claim 1, wherein the at least two liquid sections includes between 3 and 5 liquid sections that are symmetrically arranged around the UV light source in a plane perpendicular to the main axis.

6. The liquid treatment system according to claim 1, wherein each liquid section of the at least two liquid sections is an at least partially closed enclosure.

7. The liquid treatment system according to claim 1, wherein each liquid section of the at least two liquid sections has an at least partially circular cross-sectional shape in a plane perpendicular to the main axis.

8. The liquid treatment system according to claim 1, wherein
each liquid section of the at least two liquid sections includes an inner cross-sectional shape that is configured to enable the swirling motion of a stream of the liquid throughout a length of the each liquid section, and
the each liquid section includes an inner surface that has an even extension configured to enable a liquid swirl to move unrestricted within the each liquid section.

9. The liquid treatment system according to claim 1, wherein each liquid section of the at least two liquid sections is structured as a liquid channel running along the UV light source.

10. The liquid treatment system according to claim 1, wherein the plurality of swirl generating members are each active element, the active element being a stirring element, a propeller, an impeller, or a magnetic stirrer.

11. The liquid treatment system according to claim 1, wherein the plurality of swirl generating members are each a passive element, the passive element having a shape of wings, baffles, or fins.

12. The liquid treatment system according to claim 1, further comprising:
a particle supplying member configured to supply cleaning particles into the liquid in the at least two liquid sections, to prevent scaling/fouling from adhering to a surface of the UV transparent walls of the at least two liquid sections.

13. The liquid treatment system according to claim 12, further comprising:
a by-pass line configured to pass liquid and particles from the outlet opening back to the inlet opening of the liquid enclosure.

14. The liquid treatment system according to claim 13, further comprising:
a control unit capable of controlling the particle supplying member to control the supply of cleaning particles to the inlet opening in accordance with a particular particle supply procedure that includes intermittent supply of the cleaning particles.

15. The liquid treatment system according to claim 1, wherein the UV light source is a medium pressure UV lamp.

16. The liquid treatment system according to claim 1, wherein the swirling motion is such that the controlled varying distance is induced to all liquid elements of the liquid in relation to the UV light source such that all liquid elements are moved into the high UV radiation zones closest the UV light transparent wall, to achieve the uniform UV irradiation of the liquid.

* * * * *